United States Patent
Ishigaki et al.

(10) Patent No.: US 8,324,853 B2
(45) Date of Patent: Dec. 4, 2012

(54) WIPER CONTROLLER

(75) Inventors: Seiji Ishigaki, Aichi (JP); Hitoshi Muraki, Aichi (JP); Masaki Yoshino, Aichi (JP); Yoshihisa Hirano, Aichi (JP); Kenji Iwasaki, Aichi (JP); Kunihiko Ikekame, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 665 days.

(21) Appl. No.: 12/507,377

(22) Filed: Jul. 22, 2009

(65) Prior Publication Data
US 2010/0024148 A1 Feb. 4, 2010

(30) Foreign Application Priority Data

Aug. 1, 2008 (JP) .................................. 2008-199929

(51) Int. Cl.
*H02P 1/04* (2006.01)
(52) U.S. Cl. ...................... 318/443; 15/246; 15/250.001; 15/250.31
(58) Field of Classification Search .................. 318/443; 15/250.31, 250.001, 246
See application file for complete search history.

(56) References Cited

U.S. PATENT DOCUMENTS

| | | | | |
|---|---|---|---|---|
| 4,448,276 A * | 5/1984 | Nakamoto et al. | ............... | 180/90 |
| 6,260,431 B1 * | 7/2001 | Yokoyama | ...................... | 74/469 |
| 6,737,593 B1 * | 5/2004 | Porter et al. | ................... | 200/179 |
| 2001/0024167 A1 * | 9/2001 | Da Silveira Loss | .......... | 340/936 |
| 2003/0155218 A1 * | 8/2003 | Panagl | ........................ | 200/11 R |
| 2004/0149557 A1 * | 8/2004 | Sadowski et al. | ............. | 200/401 |
| 2005/0006214 A1 * | 1/2005 | Fujii | ............................. | 200/339 |
| 2005/0039969 A1 * | 2/2005 | Laukkanen | .................... | 180/333 |
| 2006/0055354 A1 * | 3/2006 | Hirose et al. | .................. | 318/444 |
| 2007/0029961 A1 * | 2/2007 | Harita et al. | .................. | 318/484 |
| 2007/0216231 A1 * | 9/2007 | Deery et al. | .................. | 307/115 |
| 2008/0156629 A1 * | 7/2008 | Bleckmann et al. | .......... | 200/557 |
| 2009/0223789 A1 * | 9/2009 | Ballard | ...................... | 200/61.54 |

FOREIGN PATENT DOCUMENTS

JP 11-321569 11/1999

OTHER PUBLICATIONS

Fig. 7 (prior art), prior to Jul. 22, 2009.

* cited by examiner

*Primary Examiner* — Kawing Chan
(74) *Attorney, Agent, or Firm* — Patterson Thuente Christensen Pedersen, P.A.

(57) ABSTRACT

A vehicle wiper controller includes a wiper drive circuit which drives a wiper. An operation switch is manipulated in a plurality of manipulation directions or to a plurality of operation mode positions when a manipulation force is applied thereto. A wiper operation control unit electronically controls the operation of the wiper and sets the wiper to an operation mode corresponding to the manipulation of the operation switch. A control signal hold circuit, discrete from the wiper operation control unit, transmits a control signal to the wiper drive circuit when the operation switch is manipulated in a predetermined first manipulation direction or when the operation switch is manipulated to a predetermined first operation mode position. The control signal hold circuit sets a hold state for holding the transmission state of the control signal.

7 Claims, 7 Drawing Sheets

Sequentially set in INT→LO→Hi→Off→Int
whenever manipulated in X direction

Sequentially set in INT→LO→Hi→Int
whenever manipulated in Y direction

Set in Off→INT→LO→Hi when manipulated upward
Set in Hi→LO→INT→Off when manipulated downward

WIPER CONTROLLER

CROSS-REFERENCE TO RELATED APPLICATIONS

This application is based upon and claims the benefit of priority from prior Japanese Patent Application No. 2008-199929, filed on Aug. 1, 2008, the entire contents of which are incorporated herein by reference.

BACKGROUND OF THE INVENTION

The present invention relates to a wiper controller, and more specifically, to a wiper controller for controlling the operation of a front window shield wiper for a vehicle.

A vehicle, such as a four-wheel automobile, includes a wiper controller for controlling the operation of a front window shield wiper (for example, refer to Japanese Laid-Open Patent Publication No. 11-321569). The wiper controller includes an operation switch. The operation switch is incorporated in a lever combination switch, which is arranged in a steering column of the vehicle. The wiper controller operates in a plurality of operation modes, for example, a "mist mode (MIST)", an "intermittent mode (INT)", a "low mode (LO)", and a "high mode (HI)". The operation switch is movable to operation mode positions respectively corresponding to the plurality of operation modes. The operation mode of the wiper controller is selected by manipulating the operation switch. A wiper arm is moved in the selected operation mode.

The operation switch is mechanically held at the operation mode position to which it has been moved. The wiper arm operates in the selected operation mode as long as the wiper controller is mechanically held at this operation mode position.

SUMMARY OF THE INVENTION

The operation switch of an electronic wiper controller employs a so-called momentary mechanism. When a manipulation force is applied to the operation switch, the operation switch displaces from a neutral position. When the operation switch becomes free from the manipulation force, the operation switch automatically returns to the neutral position.

FIG. 7 shows a wiper controller employing an operation switch having a momentary mechanism. In the wiper controller, a microcomputer 11 controls the selection of operation modes for the wiper controller. The wiper controller also controls the starting and stopping of the operation of the wiper arm. A drive circuit 13 receives a control signal ss from the microcomputer 11 and performs a switching operation that corresponds to the control signal ss. The switching of the drive circuit 13 switches the supply of direct current (DC) power from an in-vehicle power supply (not shown) to a wiper motor 16 to drive the wiper arm.

The wiper controller includes a MIST switch 14 and a wiper operation mode switch 15. Normally, the MIST switch 14 and the wiper operation mode switch 15 are operation switches having momentary mechanisms and may be manipulated by the driver of the vehicle.

When manipulated, the MIST switch 14 provides the microcomputer 11 with a drive signal n. In response to the drive signal n, the microcomputer 11 sets the wiper controller to the "MIST mode". When manipulated, the wiper operation mode switch 15 provides the microcomputer 11 with a drive signal f, g, or h corresponding to other operation modes, namely, the "INT mode", the "LO mode", or the "HI mode", so that the microcomputer 11 sets the wiper controller to the "INT mode", the "LO mode", or the "HI mode".

In the wiper controller using the operation switch having the momentary mechanism, the microcomputer 11 may fail to function properly or may be inadvertently reset before the vehicle engine is started or when the wiper arm is moving. In such an abnormal state of the microcomputer 11, the momentary mechanism returns the operation switch to an original position. As a result, the operation mode position that is being set may become unknown, the wiper arm may stop moving, or the wiper arm may become inoperable.

It is an object of the present invention to provide a vehicle wiper controller that moves the wiper just by manipulating a switch when a wiper operation control unit for electronically controlling the operation of the wiper does not operate normally.

One aspect of the present invention is a vehicle wiper controller including a wiper drive circuit which drives a wiper motor, an operation switch manipulatable in a plurality of manipulation directions or to a plurality of operation mode positions when a manipulation force is applied thereto, the operation switch automatically returning to an original position when freed from the manipulation force, a wiper operation control unit which is programmed to electronically control the operation of the wiper motor, the wiper operation control unit setting the wiper motor to an operation mode corresponding to the manipulation of the operation switch, and a control signal hold circuit coupled to the operation switch and the wiper operation control unit. When the operation switch is manipulated in a predetermined first manipulation direction or when the operation switch is manipulated to a predetermined first operation mode position, the control signal hold circuit transmits a control signal to the wiper drive circuit and is set in a hold state in which the control signal is being transmitted.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A preferred embodiment of a wiper controller according to the present invention will now be discussed.

Figure 1:
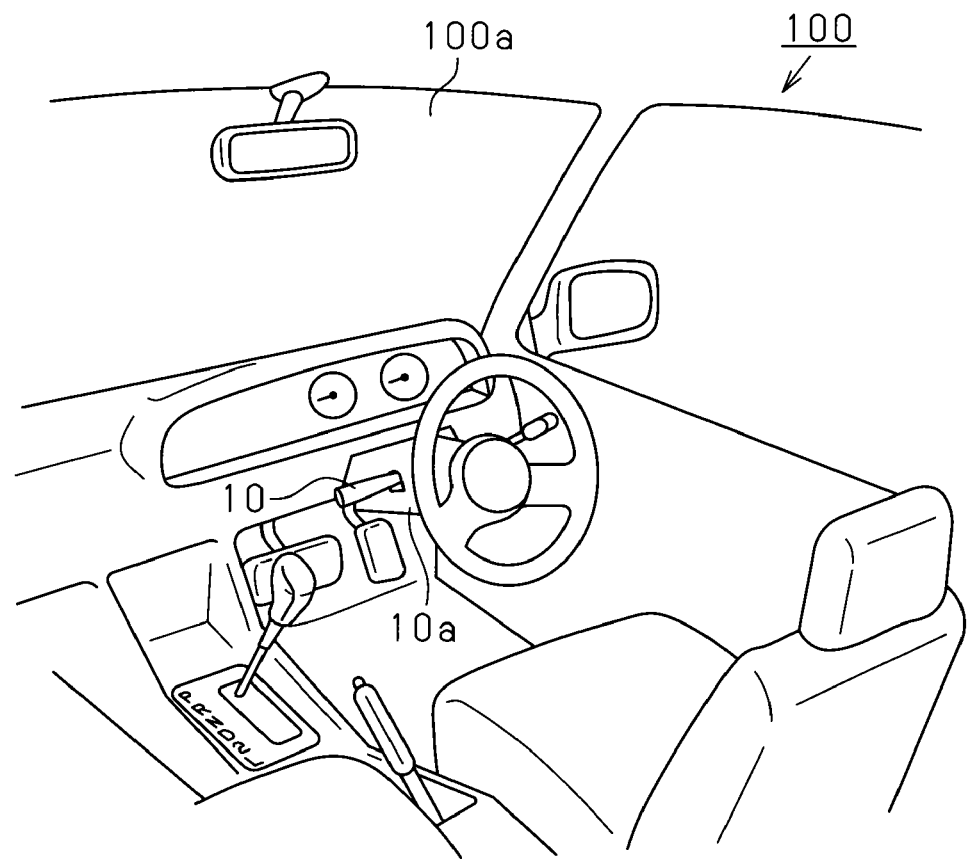
FIG. 1 is a perspective view of a lever combination switch arranged in a vehicle compartment.

Referring to FIG. 1, in this embodiment, the wiper controller is installed in a vehicle 100 to drive a wiper arm (not shown), which wipes off raindrops or the like from a front window shield 100a of the vehicle 100. In the illustrated example, the wiper controller is incorporated in a lever combination switch 10, which is arranged in a steering column 10a of the vehicle 100.

Figure 2A:
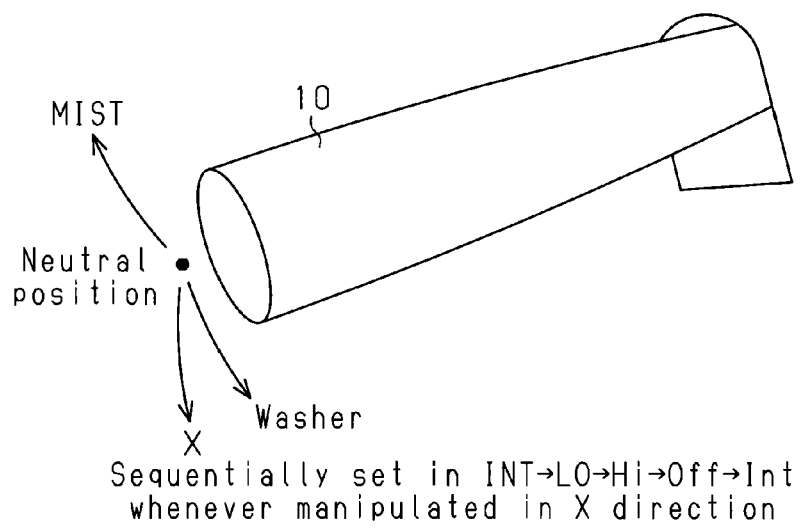
FIG. 2(a) is a diagram showing momentary operations of the lever combination switch.

The wiper controller operates in an "off (OFF) mode", an "intermittent mode (INT)", a "low mode (LO)", a "high mode (HI)", and a "mist mode (MIST)". As shown in FIG. 2(a), the operation mode of the wiper controller is set by manipulating the lever combination switch 10 in a predetermined manipulation direction. The lever combination switch 10 is an operation switch incorporating a momentary mechanism. The lever combination switch 10 automatically returns to a neutral position (original position) when the lever combination switch 10 becomes free from a manipulation force.

In the example of FIG. 2(a), the lever combination switch 10 functions as a wiper operation mode switch 5 when manipulated in an X direction (downward direction). Each time the lever combination switch 10 is manipulated (tilted) in the X direction, the wiper controller is sequentially set to "INT mode"→"LO mode"→"HI mode"→"OFF mode". The lever combination switch 10 functions as a MIST switch 4 when manipulated (tilted) towards the front of the vehicle (manipulation direction of "MIST"). For example, when the lever combination switch 10 is manipulated (tilted) towards the front of the vehicle, the wiper controller is set in the "MIST mode". When the lever combination switch 10 is manipulated (tilted) towards the rear (toward the seat), the washer function is activated to spray a washing liquid onto the front window shield 100a and reciprocate the wiper arm for a predetermined number of times (e.g., single reciprocation).

An electric circuit for the wiper controller will now be discussed with reference to FIGS. 3 and 4. The wiper controller includes a microcomputer 1, a drive circuit 3, the MIST switch 4, the wiper operation mode switch 5, and a wiper motor (wiper motor unit) 6. The microcomputer 1, the drive circuit 3, and the wiper motor 6 are connected to the positive terminal of an in-vehicle power supply Va via an ignition switch (IG S/W) of the vehicle 100 and are operable by the DC power supplied from the in-vehicle power supply Va when the ignition switch is turned ON.

When the wiper operation mode switch 5 (lever combination switch 10) is manipulated once in the X direction of FIG. 2(a) from the neutral position (original position) in a state in which the wiper arm is not moving, the microcomputer 1 sets the wiper controller in the "INT mode", and starts the intermittent operation of the wiper arm. When the wiper operation mode switch 5 (lever combination switch 10) is further manipulated once in the X direction, the microcomputer 1 changes the operation mode of the wiper controller to the "LO mode". In the "LO mode", the wiper arm continuously moves at a low speed. When the wiper operation mode switch 5 (lever combination switch 10) is further manipulated once in the X direction, the microcomputer 1 changes the operation mode of the wiper controller to the "HI mode". In the "Ho mode", the wiper arm continuously moves at a high speed. When the wiper operation mode switch 5 (lever combination switch 10) is further manipulated once in the X direction, the microcomputer 1 sets the wiper controller in the "OFF mode" and stops moving the wiper arm. When the wiper operation mode switch 5 (lever combination switch 10) is further manipulated once in the X direction, the operation mode changes to the "INT mode".

When the MIST switch 4 (lever combination switch 10) is manipulated in the direction indicated as "MIST", the microcomputer 1 changes the wiper controller to the "Mist mode" and reciprocates the wiper arm for a predetermined number of times (e.g., single reciprocation).

In this embodiment, to facilitate understanding, a manipulation of the wiper operation mode switch 5 (lever combination switch 10) performed so that the wiper controller is set in or changed to the "OFF mode" is referred to as an "OFF operation". Manipulations of the wiper operation mode switch 5 performed so that the wiper controller is set in or changed to the "INT mode", the "LO mode", or the "HI mode" and a manipulation of the MIST switch 4 performed to set the wiper controller to the "MIST mode" are each referred to as an "ON operation".

Figure 3:
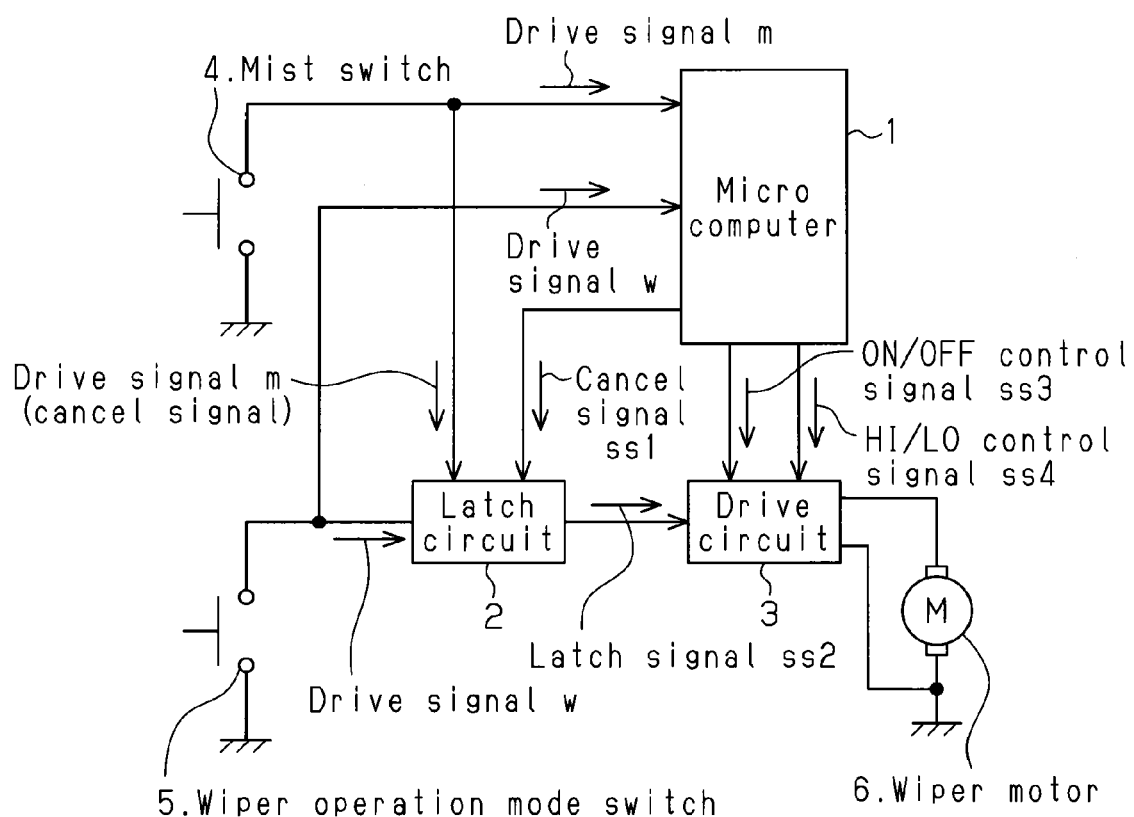
FIG. 3 is a block diagram showing a preferred embodiment of a wiper controller according to the present invention.

As shown in FIG. 3, the microcomputer 1 is coupled to the drive circuit 3. The drive circuit 3 performs a switching operation for starting and stopping the supply of power from the in-vehicle power supply Va (see FIG. 4) to the wiper motor 6 in accordance with an ON/OFF control signal ss3 from the microcomputer 1. The drive circuit 3 switches a HI mode terminal and a LO mode terminal of the wiper motor 6 in accordance with a HI/LO control signal ss4 from the microcomputer 1 (see FIG. 4).

The wiper motor 6 has a connection terminal connected to ground and a connection terminal connected to the drive circuit 3. The operation of the drive circuit 3 starts and stops the supply of DC power from the in-vehicle power supply Va to the wiper motor 6 and switches the operation mode. The wiper motor 6 drives the wiper arm of the vehicle 100. Thus, the microcomputer 1 and the drive circuit 3 control the operation of the wiper arm.

In the wiper controller of this embodiment, a drive signal w or a drive signal m is provided to the microcomputer 1 by the ON/OFF manipulation of the lever combination switch 10. The wiper controller is set in the "INT mode", the "LO mode", the "HI mode", or the "OFF mode" whenever the microcomputer 1 receives the drive signal w. Further, the wiper controller is set in the "MIST mode" when the microcomputer 1 receives the drive signal m. The wiper arm moves or stops moving in correspondence with the set operation mode.

The wiper controller of this embodiment includes a latch circuit 2 serving as a control signal hold circuit. The latch circuit 2 transmits a latch signal ss2 (latch current) to the drive circuit 3 and is set in a hold state in which the latch signal ss2 (latch current) is being transmitted to the drive circuit 3 in response to the ON manipulation of the lever combination switch 10 and holds the transmission state of the latch signal ss2. In one embodiment, the latch signal ss2 is continuously transmitted from the latch circuit 2 to the drive circuit 3 unless a cancel signal is provided to the latch circuit 2.

The latch circuit 2 is connected to the microcomputer 1 and the drive circuit 3. In accordance with the latch signal ss2 from the latch circuit 2, the drive circuit 3 performs a switching operation for starting and stopping the supply of power from the in-vehicle power supply Va (see FIG. 4) to the wiper motor 6. The operation of the wiper arm of the vehicle 100 is started and stopped by the switching operation.

The latch circuit 2 is connected to the MIST switch 4 to receive the drive signal m and connected to the microcomputer 1 to receive a cancel signal ss1.

Figure 4:
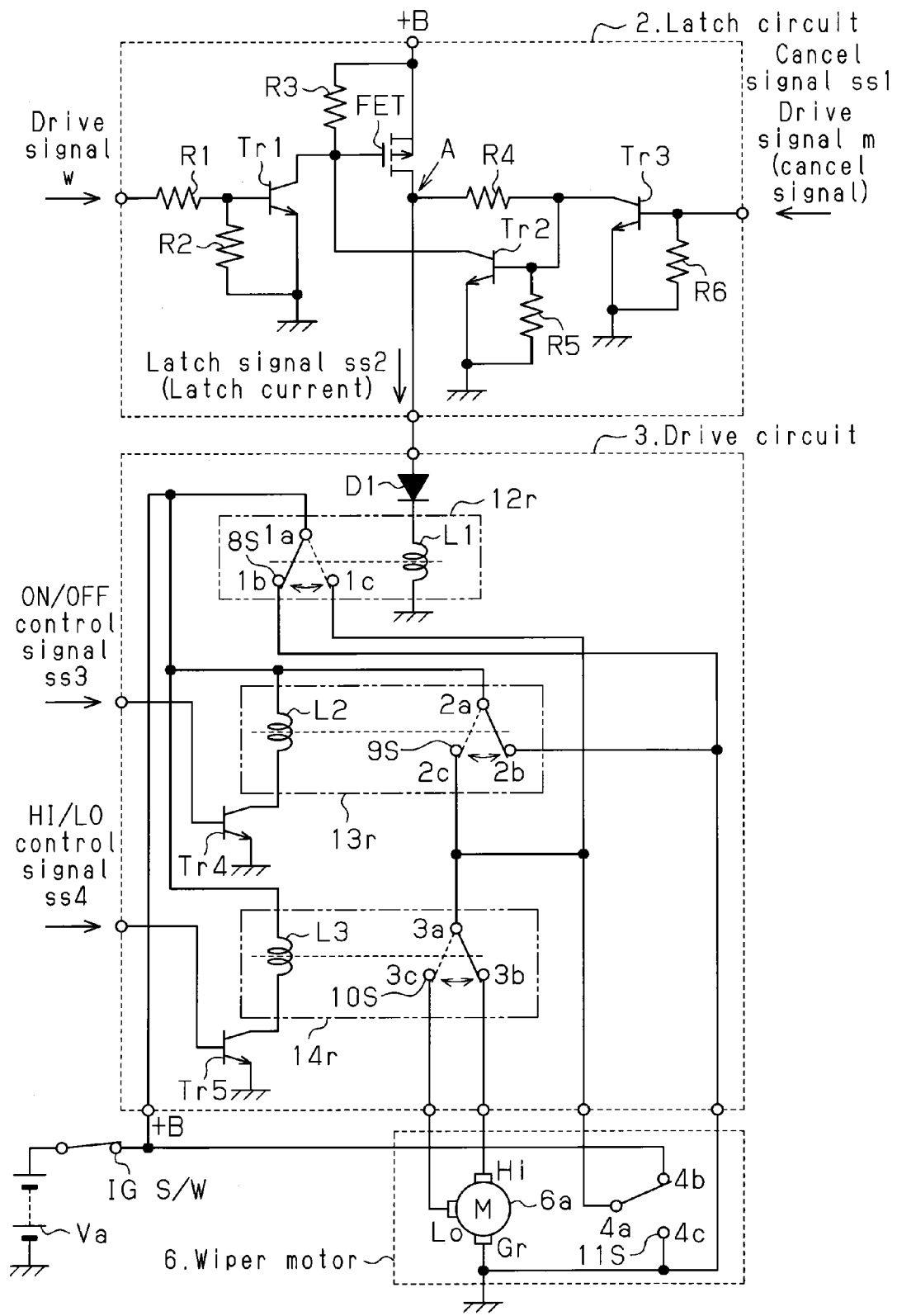
FIG. 4 is an electric circuit diagram of a latch circuit and a drive circuit shown in FIG. 3.

As shown in FIG. 4, the drive circuit 3 includes NPN transistors Tr4 and Tr5, coils L1 to L3, a +B terminal connected to the positive terminal of the in-vehicle power supply Va via the ignition switch of the vehicle 100, switches 8S to 10S, and a diode D1. The ignition switch is turned ON in the state of FIG. 4.

The coil L1 and the switch 8S form a latch signal relay 12r. The coil L2 and the switch 9S form an ON/OFF relay 13r. The coil L3 and the switch 10S form a HI/LO switch relay 14r.

The coil L1 has one end connected to the ground and another end connected to the latch circuit 2 via the diode D1 to receive the latch signal ss2 from the latch circuit 2. The switch 8S includes a common contact 1a connected to the +B terminal, a first contact 1b connected to ground, and a second contact 1c.

The base terminal of the transistor Tr4 is connected to the microcomputer 1 to receive the ON/OFF control signal ss3 (see FIG. 3). The collector terminal of the transistor Tr4 is connected to the +B terminal through the coil L2. The emitter terminal of the transistor Tr4 is connected to the ground. The switch 9S includes a common contact 2a connected to the +B terminal, a first contact 2b connected to ground, and a second contact 2c.

The transistor Tr5 has a base terminal, which is connected to the microcomputer 1 to receive the HI/LO control signal ss4 (see FIG. 3), a collector terminal, which is connected to the +B terminal via the coil L3, and an emitter terminal, which is connected to the ground. The switch 10S includes a common contact 3a, a first contact 3b, and a second contact 3c. The common contact 3a is connected to the second contact 1c of the switch 8c and the second contact 2c of the switch 9S. The first contact 3b is connected to the HI mode terminal of the wiper motor 6. The second contact 3c is connected to the LO mode terminal of the wiper motor 6.

The wiper motor 6 includes a DC motor body 6a, which has the HI mode terminal, the LO mode terminal, and a ground terminal Gr connected to the ground. The wiper motor 6 further includes an automatic stop circuit 11S for controlling the wiper arm to stop at a stop position located at a lower part of the front window shield. The automatic stop circuit 11S includes a common contact 4a, a first contact 4b, and a second contact 4c. The common contact 4a is connected to the second contact 1c of the switch 8S of the drive circuit 3 and the second contact 2c of the switch 9S (common contact 3a of the switch 10S) of the drive circuit 3. The first contact 4b is connected to the positive terminal of the in-vehicle power supply Va. The second contact 4c is connected to ground. FIG. 4 shows a state in which the common contact 4a is connected to the first contact 4b. In this state, the wiper arm is performing wiping and not located at the stop position.

In the drive circuit 3, when the base terminal of the transistor Tr4 receives the ON/OFF control signal ss3, the transistor Tr4 goes ON. This excites the coil L2. When the coil L2 is excited, the common contact 2a of the switch 9S is connected to the second contact 2c. This turns ON the ON/OFF relay 13r. When the ON/OFF control signal ss3 is stopped, the transistor Tr4 goes OFF. This de-excites the coil L2 and connects the common contact 2a to the first contact 2b. Thus, the ON/OFF relay 13r is turned OFF.

In the drive circuit 3, when the base terminal of the transistor Tr5 receives the HI/LO control signal ss4, the transistor Tr5 goes ON. This excites the coil L3. When the coil L3 is excited, the common contact 3a of the switch 10S is connected to the second contact 3c. This turns ON the HI/LO switch relay 14r. When the HI/LO control signal ss4 is stopped, the transistor Tr5 goes OFF. This de-excites the coil L3 and connects the common contact 3a to the first contact 3b. Thus, the HI/LO switch relay 14r is turned OFF.

In accordance with the ON/OFF control signal ss3 provided intermittently in predetermined cycles from the microcomputer 1 to the drive circuit 3, the ON/OFF relay 13 is intermittently turned ON and OFF in predetermined cycles, and the wiper controller operates in the "INT mode". In other words, when the ON/OFF relay 13r is turned ON in a state in which the latch signal relay 12r is OFF and the HI/LO switch relay 14r is OFF, current flows to the HI mode terminal of the DC motor body 6a, and the wiper arm moves continuously. When the ON/OFF relay 13r is turned OFF from this state, current stops flowing to the HI mode terminal of the DC motor body 6a, and the wiper arm stops moving. The ON/OFF control signal ss3 is intermittently input in predetermined cycles from the microcomputer 1 when the wiper controller is set to the "INT mode". Thus, the wiper arm moves intermittently in synchronism with the ON/OFF control signal ss3.

In accordance with the HI/LO control signal ss4 provided from the microcomputer 1 to the drive circuit 3, the HI/LO switch relay 14r is turned ON and OFF, and the wiper controller operates at the "HI mode" or the "LO mode". In other words, when the HI/LO switch relay 14r is turned ON in a state in which the latch signal relay 12r is OFF and the ON/OFF relay 13r is ON, current flows to the LO mode terminal of the DC motor body 6a, and the wiper arm moves continuously at a low speed ("LO mode"). When the HI/LO switch relay 14r is turned OFF, current flows to the HI mode terminal of the DC motor body 6a, and the wiper arm moves continuously at a high speed ("HI mode").

When the microcomputer 1 stops providing the ON/OFF control signal ss3 to the drive circuit 3, the ON/OFF relay 13r is turned OFF and the wiper controller is set in the "OFF mode". In other words, when the ON/OFF relay 13r is turned OFF in a state in which the latch signal relay 12r is OFF and the HI/LO relay 14r is OFF, the switch 9S stops the flow of current from the +B terminal to the terminal of the DC motor body 6a. This stops moving the wiper arm.

As shown in FIG. 4, the latch circuit 2 includes a P-channel MOSFET (hereinafter simply referred to as an "FET") serving as a switching element, NPN transistors Tr1 to Tr3, resistors R1 to R6, and the +B terminal. The +B terminal is connected to the positive terminal of the in-vehicle power supply Va via the ignition switch.

The transistor Tr1 has a base terminal, which is connected to the wiper operation mode switch 5 via the resistor R1 and which receives the drive signal w (see FIG. 3). The base terminal is connected to ground via the resistor R2. The transistor Tr1 has a collector terminal connected to the gate terminal of the FET and to the +B terminal via the resistor R3. The transistor Tr1 also has an emitter terminal connected to ground.

The transistor Tr2 has a base terminal, which is connected to ground via the resistor R5, an emitter terminal, which is directly connected to ground, and a collector terminal, which is connected to the gate of the FET and to the +B terminal via the resistor R3.

The transistor Tr3 has a base terminal connected to the MIST switch 4 so as to receive the drive signal m. The base terminal of the transistor Tr3 is connected to the microcomputer 1 to receive the cancel signal ss1 for canceling the hold state (latch state) of the latch circuit 2 (see FIG. 3). In the same manner as the cancel signal ss1, the drive signal m received by the latch circuit 2 from the MIST switch 4 functions as a cancel signal for cancelling the hold state of the latch circuit 2. The base terminal of the transistor Tr3 is also connected to ground via the resistor R6. The transistor Tr3 has an emitter terminal, which is directly connected to ground, and a collector terminal, which is connected to the drain terminal of the FET and a node (connection point) A via the resistor R4. The collector terminal of the transistor Tr3 is also directly connected to the base terminal of the transistor Tr2.

The FET has a gate terminal, which is connected to the +B terminal via the resistor R3, a source terminal, which is directly connected to the +B terminal, and a drain terminal, which is connected to ground via the node A and the diode D1 and coil L2, which are connected in series.

When the FET of the latch circuit 2 goes ON, the latch circuit 2 provides the latch signal ss2 to the drive circuit 3. In other words, current flows from the +B terminal to the coil L1 via the node A and the diode D1 of the drive circuit 3. This excites the coil L1. When the FET of the latch circuit 2 goes OFF, the latch signal ss2 is output from the latch circuit 2 to the drive circuit 3. In other words, the coil L1 is de-excited by stopping the flow of current. The common contact 1a of the switch 8S is connected to the second contact 1c when the coil L1. This turns ON the latch signal relay 12r. Further, the common contact 1a is connected to the first contact 1b when the coil L1 is de-excited. This turns OFF the latch signal relay 12r.

In an initial state, the transistor Tr1 is turned OFF and potential at the gate terminal of the FET is equal to the potential at the positive terminal of the in-vehicle power supply Va. Thus, the FET is turned OFF.

When the drive signal w is input to the base terminal of the transistor Tr1 as the wiper operation mode switch 5 (lever combination switch 10) goes ON and OFF, the transistor Tr1 goes ON. As a result, the potential at the gate terminal of the FET becomes low and equal to the ground potential. This turns ON the FET. Thus, the potential at the node A becomes high and equal to the potential at the in-vehicle power supply Va. Further, the latch signal ss2 (latch current) is provided from the latch circuit 2 to the coil L1 via the diode D1 of the drive circuit 3. This excites the coil L1. In this state, base current flows from the +B terminal to the transistor Tr2 via the FET, the node A, and the resistor R4. This turns ON the transistor Tr2. As a result, the potential at the gate terminal of the FET becomes the ground potential. Further, regardless of whether the transistor Tr1 is ON or OFF, the low potential state of the gate terminal of the FET is held, the high potential state of the node A is maintained, and the excitation state of the coil L1 is maintained by the latch signal ss2. In this manner, the latch circuit 2 is set in a hold state in which the state of the latch signal ss2 (transmission state of the latch signal ss2 sent to the drive circuit 3). The common contact 1a of the switch 8S in the drive circuit 3 is connected to the second contact 1c when the coil L1 is excited. This maintain the latch signal relay 12r in the ON state, supplies DC power from the +B terminal to the wiper motor 6 via the switch 8S and the switch 10S, and starts to drive and move the wiper arm of the vehicle 100. Once the transistor Tr1 goes ON, the transistor Tr1 goes OFF again when the drive signal w is stopped as the wiper operation mode switch 5 (lever combination switch 10) becomes free from the manipulation force that has been applied thereto.

In the wiper controller of this embodiment, when the MIST switch 4 (lever combination switch 10) is manipulated in the manipulation direction of the "MIST" and thus goes ON, the drive signal m, which functions as the cancel signal, is transmitted to the latch circuit 2.

When the MIST switch 4 goes ON, the drive signal m is input to the base terminal of the transistor Tr3. When the transistor Tr3 goes ON, the FET returns to the OFF state as the transistor Tr1 goes OFF. This cancels the high potential state of the node A and the potential at the node A becomes low and equal to the ground potential via the resistor R4 and the transistor Tr3. As a result, the output of the latch signal ss2 to the coil L1 is stopped, and the coil L1 is de-excited. The common contact 1a of the switch 8S of the drive circuit 3 is connected to the first contact 1b when the coil L1 is de-excited. This turns OFF the latch signal relay 12r. Further, the supply of DC power to the wiper motor 6 via the switch 8S and the switch 10S is stopped, and the wiper arm of the vehicle 100 stops moving.

In the wiper controller of this embodiment, the microcomputer 1 transmits the cancel signal ss1 to the latch circuit 2 to cancel the hold state of the latch circuit 2.

For example, when the lever combination switch 10 is turned ON and the drive signal w or the drive signal m is received, the microcomputer 1 sets the wiper controller in the corresponding operation mode. When a predetermined time elapses from the setting, the microcomputer 1 transmits the cancel signal ss1 to the latch circuit 2. In response to the cancel signal ss1, the transistor Tr3 of the latch circuit 2 goes ON. As described above, the FET of the latch circuit 2 is returned to the OFF state when the transistor Tr1 goes OFF. Thus, the potential at node A becomes low and equal to the ground potential via the resistor R4 and the transistor Tr3, which has been turned ON. This stops the latch signal ss2. In this manner, the hold state of the latch circuit 2 is canceled.

In this embodiment, when the lever combination switch 10 is turned OFF, the drive signal w is input to the microcomputer 1. However, the microcomputer 1 does not transmit the cancel signal ss1 to the latch circuit 2 when the lever combination switch 10 is turned OFF.

The operation of the wiper controller in a normal state and an abnormal state will now be discussed with reference to FIGS. 5 and 6.

<Operation of Wiper Controller in Normal State>

The wiper controller is in a normal state when the microcomputer 1 is functioning normally.

Figure 5:
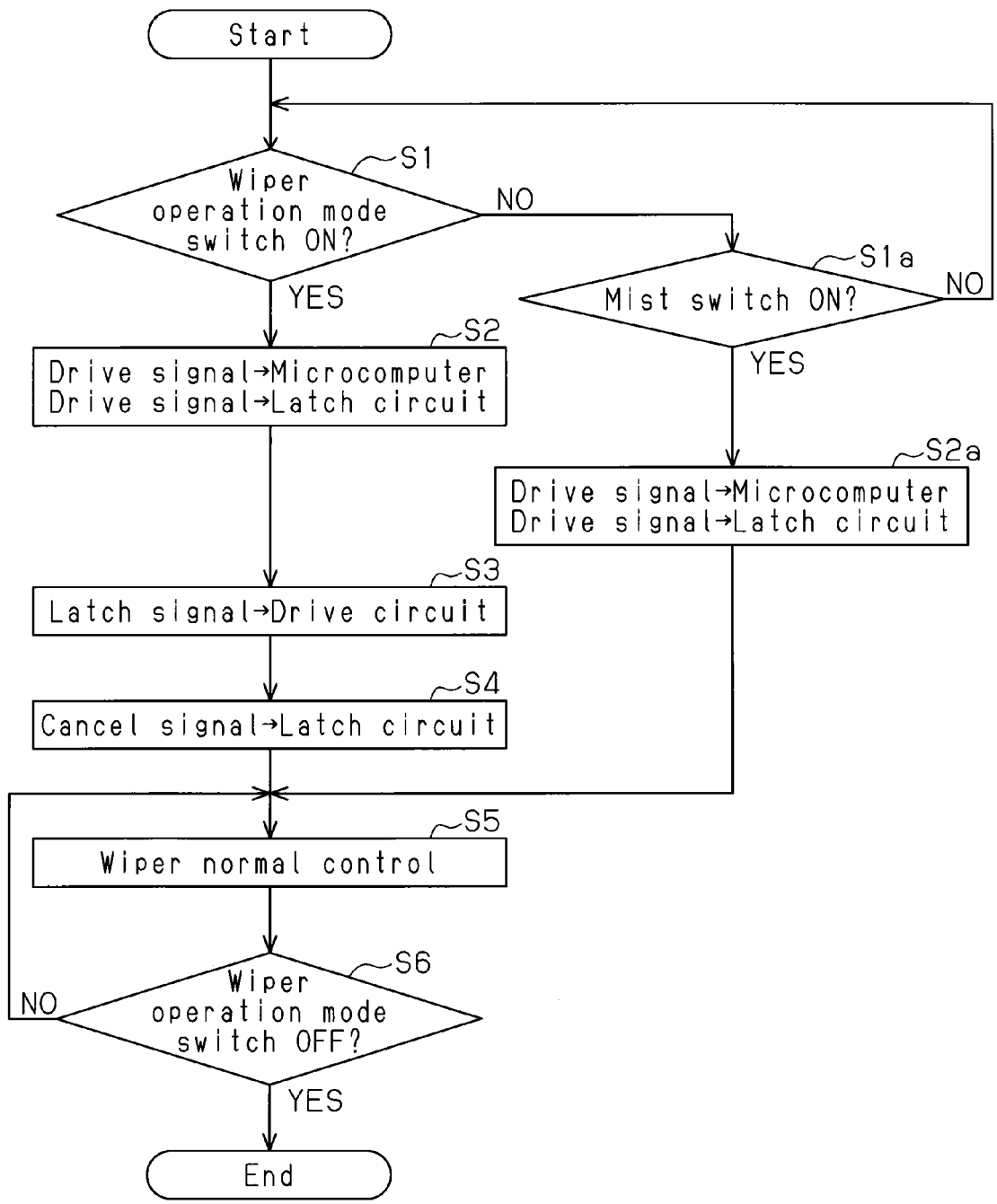
FIG. 5 is a flowchart showing the operation of the wiper controller in a normal state.

Referring to FIG. 5, in step S1, when the wiper operation mode switch 5 goes ON (YES), the wiper controller proceeds to step S2.

In step S2, the drive signal w is transmitted to the microcomputer 1 and the latch circuit 2. The microcomputer 1 sets the wiper controller in the "INT mode", the "LO mode", the "HI mode", or the "OFF mode" in accordance with the number of times the drive signal w is received. The drive signal w sets the latch circuit 2 in the hold state.

In step S3, the latch circuit 2 in the hold state provides the latch signal ss2 to the drive circuit 3. This starts moving the wiper arm of the vehicle 100.

In step S4, the microcomputer 1 provides the cancel signal ss1 to the latch circuit 2. The cancels the hold state of the latch circuit 2.

In step S5, under the control of the microcomputer 1, the drive circuit 3 and the wiper motor 6 moves and stops the wiper arm of the vehicle 100 in accordance with the set operation mode (normal control of the wiper).

If the wiper operation mode switch 5 is not ON (NO) in step S1, the wiper controller proceeds to step S1a. Then, when the MIST switch 4 goes ON (YES) in step S1a, the wiper controller proceeds to step S2a. If the MIST switch 4 is not ON (NO) in step S1a, the wiper controller returns to step S1 and continues to wait for the wiper operation mode switch 5 to be manipulated.

In step S2a, the drive signal m is provided from the MIST switch 4 to the microcomputer 1. The microcomputer 1 sets the wiper controller to the "MIST mode" based on the drive signal m. The drive signal m is also provided from the MIST switch 4 to the latch circuit 2. (In this case, the hold state of the latch circuit 2 is not canceled by the drive signal m since the hold state of the latch circuit 2 has already been canceled in step S4).

If the wiper operation mode switch 5 does not go OFF (NO in step S6), the normal control of the wiper of is continued in step S4. If the wiper operation mode switch 5 goes OFF (YES in step S6), the movement of the wiper arm is stopped, and process is once terminated.

<Operation of Wiper Controller in Abnormal State>

The wiper controller is in an abnormal state when the microcomputer 1 fails to function properly or when the microcomputer 1 is inadvertently reset before the engine of the vehicle 100 is started or when the wiper arm is moving.

Figure 6:
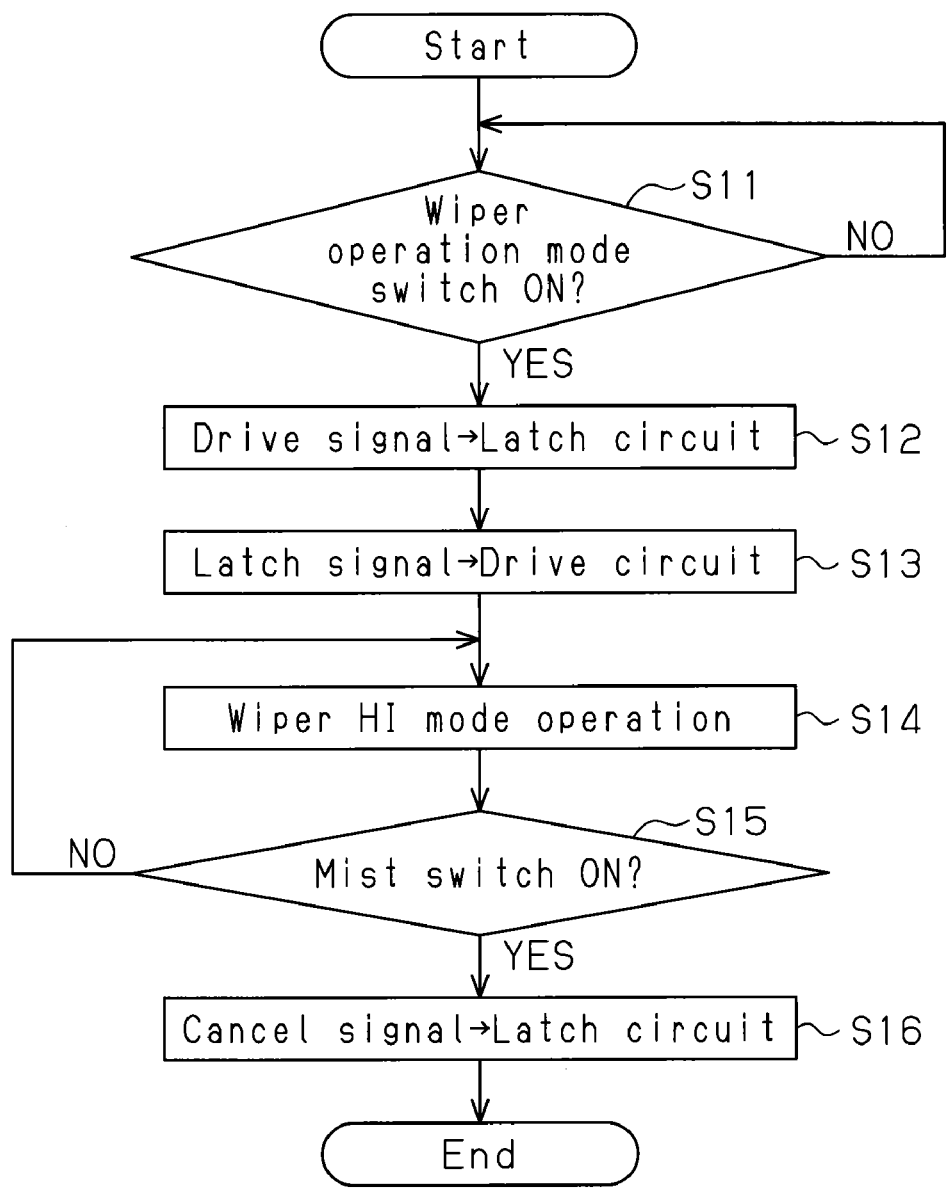
FIG. 6 is a flowchart showing the operation of the wiper controller in an abnormal state.
Figure 7:
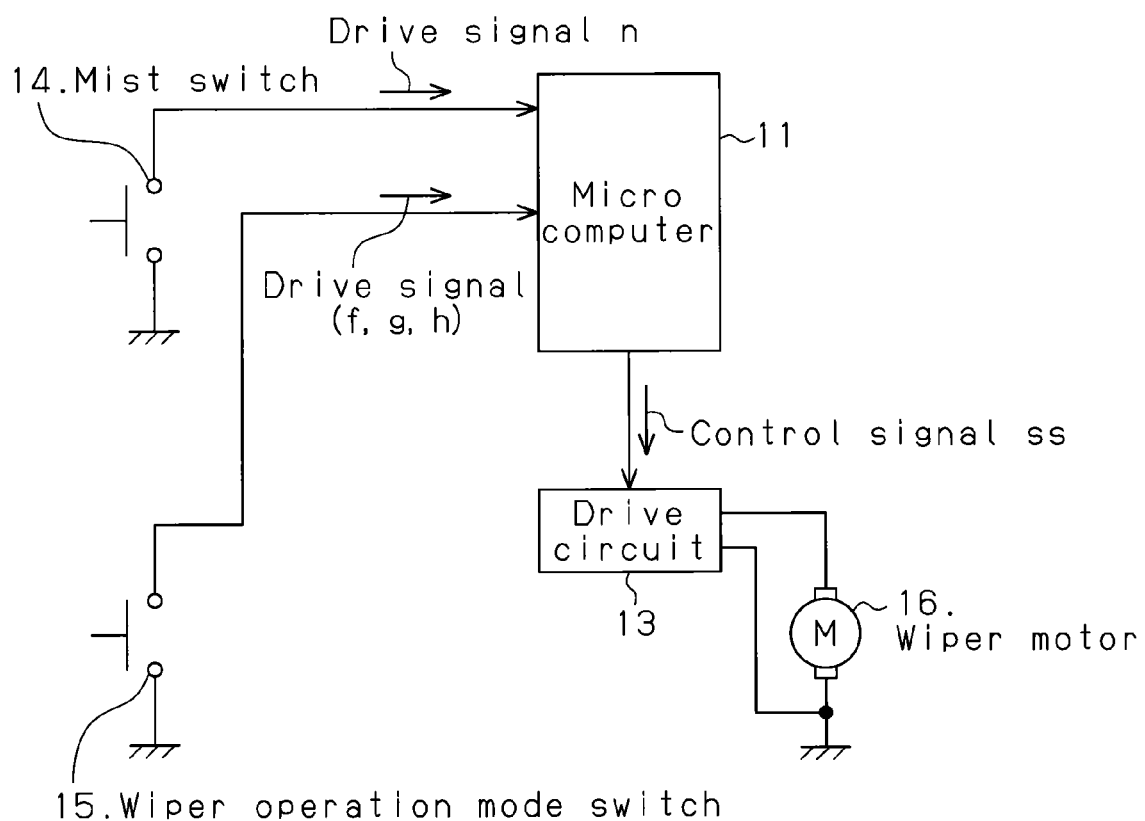
FIG. 7 is a block diagram of a wiper controller in the prior art.

Referring to FIG. 6, when the wiper operation mode switch 5 goes ON (YES in step S11), wiper controller proceeds to step S12. If the wiper operation mode switch 5 is not ON (NO in step S11), the wiper controller waits until the wiper operation mode switch 5 is manipulated.

In step S12, in response to the drive signal w provided to the latch circuit 2 from the wiper operation mode switch 5, the latch circuit 2 shifts to the hold state described above.

In step S13, the latch circuit 2 provides the latch signal ss2 to the drive circuit 3. This starts moving the wiper arm of the vehicle 100. For example, the latch signal relay 12r is ON, the ON/OFF relay 13r is OFF, and the HI/LO switch relay 14r is OFF. Thus, operation in the "HI mode" starts.

Thereafter, in step S14, the drive circuit 3 and the wiper motor 6 continues to move the wiper arm of the vehicle 100 in the "HI mode".

In step S15, which follows step S14, if the MIST switch 4 goes ON (YES), the wiper controller proceeds to step S16.

In step S16, the latch circuit 2 receives the drive signal m from the MIST switch 4. The drive signal m is the cancel signal for canceling the hold state of the latch circuit 2. The cancel signal stops the latch signal ss2 provided from the latch circuit 2 to the drive circuit 3. This stops moving the wiper arm. Processing is then once terminated.

In this manner, the latch circuit 2 allows for the operation of the wiper arm even if the microcomputer 1 is inadvertently reset or not functioning properly. The latch circuit 2 is a circuit that differs from the microcomputer 1 and serves as a backup for the microcomputer 1 when an abnormality occurs.

This embodiment has the advantages described below.

(1) In an abnormal state in which the microcomputer 1 is inadvertently reset or not functioning properly, a fail safe function becomes effective for moving the wiper arm by transmitting the latch signal ss2 to the drive circuit via the latch circuit 2 when the MIST switch 4 goes ON. This improves the reliability of the wiper controller. Further, the wiper arm is operated in an abnormal state by the latch circuit 2, which has a simple structure. Thus, there is no need for a backup microcomputer for emergency use, and the fail safe function may be realized with low cost.

(2) The drive signal m serving as the cancel signal is transmitted to the latch circuit 2 when the MIST switch 4 is turned ON. Thus, without the use of the microcomputer 1, the hold state in which the transmission state of the latch signal ss2 is held by the latch circuit 2 may be canceled, and the operation of the wiper arm may be stopped.

(3) After the latch circuit 2 is once set in the hold state in which the transmission state of the latch signal ss2 sent to the drive circuit 3 is held, the microcomputer 1 cancels the hold state. Thus, the microcomputer 1 is automatically shifted to a state in which it automatically control the operation of the wiper arm.

(4) In an abnormal state, such as when the microcomputer 1 is inadvertently reset or not functioning properly, the fail safe function of the latch circuit 2 causes the drive circuit 3 to drive the motor 6 in the "HI mode" when the wiper arm starts to move. This ensures that a field of view of the vehicle driver is obtained with the high-speed operation of the wiper arm even in an abnormal state under a situation in which there is a large amount of rainfall.

It should be apparent to those skilled in the art that the present invention may be embodied in many other specific forms without departing from the spirit or scope of the invention. Particularly, it should be understood that the present invention may be embodied in the following forms.

In the above-described embodiment, the microcomputer 1 transmits the drive signal m, which serves as the cancel signal, to the latch circuit 2 under the condition that the lever combination switch 10 is manipulated in the manipulation direction of the "MIST". Instead, the cancel signal may be transmitted to the latch circuit 2 under the condition that the washer switch incorporated in the lever combination switch 10 is manipulated.

In the above-described embodiment, the latch circuit 2 is formed by an analog circuit including the transistor Tr1 and the P-channel MOSFET. Instead, the latch circuit 2 may be formed by a digital circuit including an RS flip-flop circuit.

In the above-described embodiment, the wiper controller is set in each operation mode by manipulating the lever combination switch 10 in a predetermined manipulation direction. Instead, the wiper controller may be set in each operation mode by rotating an operation knob (operation switch) arranged on the lever combination switch 10 to switch between a plurality of operation mode positions arranged in the circumferential direction.

Figure 2B:
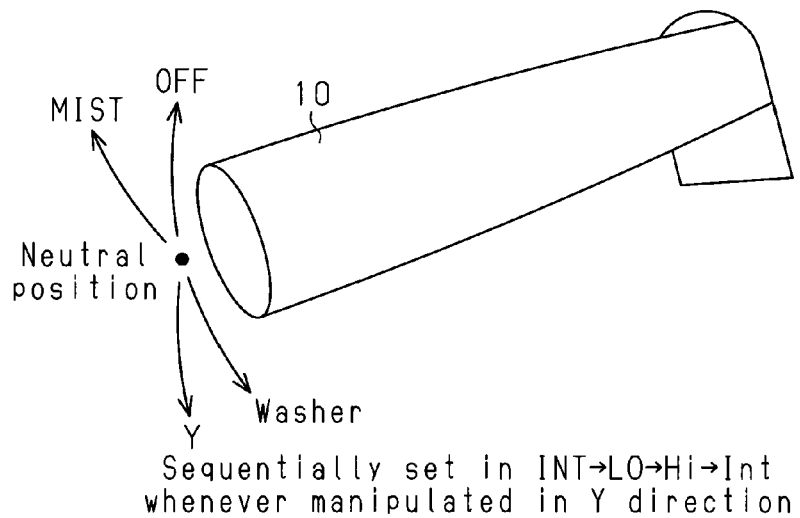
FIGS. 2(b) and 2(c) each show alternative embodiment of the lever combination switch.
Figure 2C:
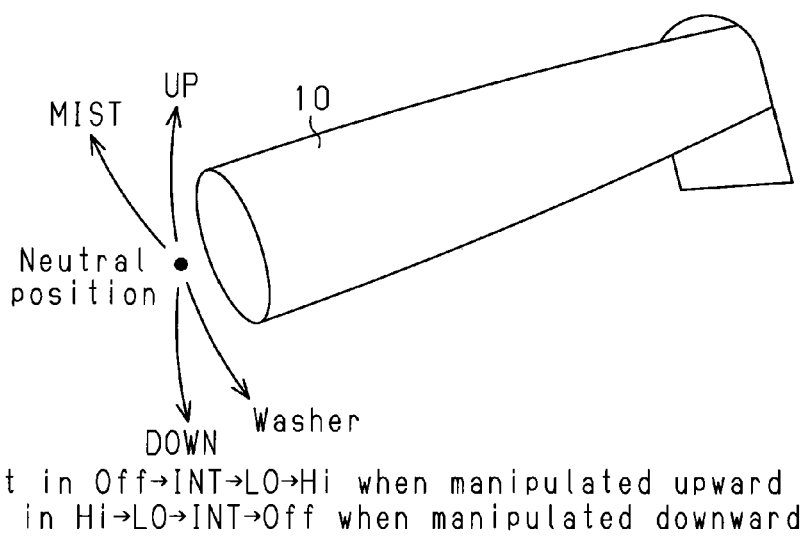

In the example of FIG. 2(a), whenever manipulated in the X direction (downward direction), the lever combination switch 10 is sequentially set in the "INT mode"→"LO mode"→"HI mode"→"OFF mode". Instead, the lever combination switch 10 may be changed as shown in FIGS. 2(b) and 2(c). In the example of FIG. 2(b), the lever combination switch 10 is set in the "OFF mode" when manipulated in an OFF manipulation direction (upward direction) and sequentially set in the "INT mode"→"LO mode"→"HI mode" each time it is manipulated in the Y direction (downward direction). In this example, when the lever combination switch 10 is turned OFF, an OFF operation signal indicating that the lever combination switch 10 has been turned OFF is input to the microcomputer 1 (drive signal w is not input). Then, such OFF operation transmits an OFF operation signal to the latch circuit 2 as the cancel signal for canceling the hold state of the latch circuit 2. Further, the input of the ON/OFF control signal ss3 from the microcomputer 1 to the drive circuit 3 is stopped based on the OFF operation signal. In the example of FIG. 2(c), the lever combination switch 10 is set in the "OFF mode"→"INT mode"→"LO mode"→"HI mode" by manipulating the lever combination switch 10 in the UP direction (upward direction). The lever combination switch 10 is set in the "HI mode"→"LO mode"→"INT mode"→"OFF mode" by manipulating the lever combination switch 10 in the DOWN direction (downward direction).

In the wiper controller, the cost of the wiper controller is lower when the latch circuit 2 is an analog circuit compared to when the latch circuit 2 is formed by a microcomputer.

The present examples and embodiments are to be considered as illustrative and not restrictive, and the invention is not to be limited to the details given herein, but may be modified within the scope and equivalence of the appended claims.

What is claimed is:

1. A vehicle wiper controller, comprising:
   a wiper drive circuit which drives a wiper motor;
   an operation switch manipulatable in a plurality of manipulation directions or to a plurality of operation mode positions when a manipulation force is applied thereto, the operation switch automatically returning to an original position when freed from the manipulation force;

a wiper operation control unit which is programmed to electronically control the operation of the wiper motor, the wiper operation control unit setting the wiper motor to an operation mode corresponding to the manipulation of the operation switch by transmitting a control signal to the wiper drive unit; and a control signal hold circuit coupled to the operation switch, the wiper operation control unit, and the wiper drive circuit, wherein when the operation switch is manipulated in a predetermined first manipulation direction or when the operation switch is manipulated to a predetermined first operation mode position, the control signal hold circuit transmits a hold signal to the wiper drive circuit and is set in a hold state in which the hold signal is being transmitted to the wiper drive circuit; and wherein the hold signal is transmitted to the wiper drive circuit independent of the transmission of the control signal to the drive unit by the wiper operation control unit and the wiper drive circuit drives the wiper motor when receiving either of the control signal transmitted from the wiper operation control unit or the hold signal transmitted from the control signal hold circuit.

2. The vehicle wiper controller according to claim 1, wherein the control signal hold circuit is provided with a cancel signal for canceling the hold state when the operation switch is manipulated in a predetermined second manipulation direction, which differs from the predetermined first manipulation direction, or when the operation switch is manipulated to a predetermined second operation mode position, which differs from the predetermined first operation mode position.

3. The vehicle wiper controller according to claim 1, wherein after the control signal hold circuit is set in the hold state, the wiper operation control unit transmits a cancel signal to the control signal hold circuit to cancel the hold state.

4. The vehicle wiper controller according to claim 1, wherein the wiper drive circuit operates the wiper motor at a high speed when the control signal transmitted from the control signal hold circuit to the wiper drive circuit starts operation of the wiper motor.

5. The vehicle wiper controller according to claim 1, wherein the control signal hold circuit is a latch circuit discrete from the wiper operation control unit.

6. The vehicle wiper controller according to claim 5, wherein the latch circuit continuously transmits the hold signal to the wiper drive circuit unless a cancel signal is provided to the latch circuit.

7. The vehicle wiper controller according to claim 6, wherein the operation switch transmits the cancel signal to the latch circuit when the operation switch is manipulated in a predetermined second manipulation direction, which differs from the predetermined first manipulation direction, or when the operation switch is manipulated to a predetermined second operation mode position, which differs from the predetermined first operation mode position.

* * * * *